United States Patent [19]
Lammers

[11] 3,798,648
[45] Mar. 19, 1974

[54] HIGH RESOLUTION AIRBORNE SIGNAL PROCESSING SYSTEM

[76] Inventor: Uve H. W. Lammers, 5 San Mateo Dr., Chelmsford, Mass. 01824

[22] Filed: June 27, 1972

[21] Appl. No.: 266,779

Related U.S. Application Data
[63] Continuation-in-part of Ser. No. 833,825, June 16, 1969, abandoned.

[52] U.S. Cl......... 343/113 DE, 343/102, 343/113 R
[51] Int. Cl............................................... G01s 3/52
[58] Field of Search ......... 343/102, 113 R, 113 DE, 343/114

[56] References Cited
UNITED STATES PATENTS
2,479,567  8/1949  Hallman, Jr. ........................ 343/104
2,996,711  8/1961  Heiser ......................... 343/113 R X
2,762,043  9/1956  Earp ...................... 343/113 DE UX

*Primary Examiner*—Maynard R. Wilbur
*Assistant Examiner*—Richard E. Berger

[57] ABSTRACT

A two-antenna reception system with fixed-position antennas to receive linearly frequency-modulated signals or linearly position-modulated antennas to receive fixed-frequency signals. The difference frequency generated from the antenna signals represents the angle of arrival with respect to the system baseline. Two such systems with nonparallel baselines yield angular information in space.

1 Claim, 4 Drawing Figures

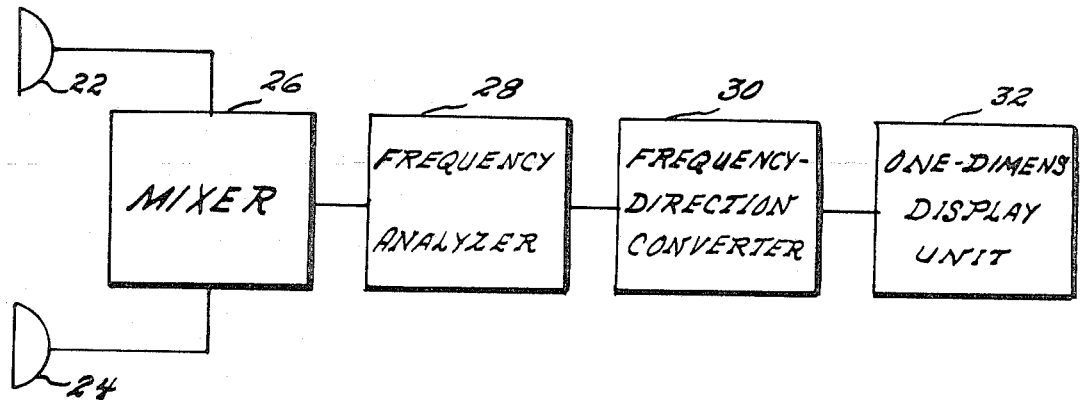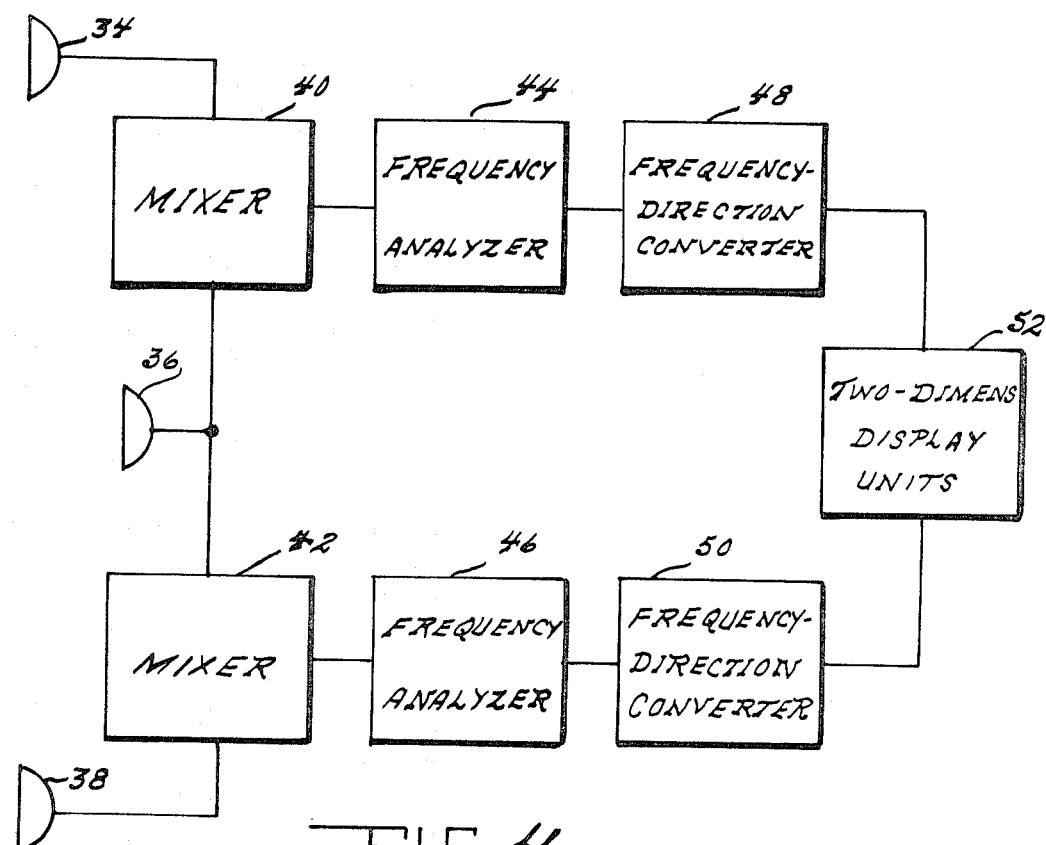

HIGH RESOLUTION AIRBORNE SIGNAL PROCESSING SYSTEM

This application is a continuation-in-part of my application Ser. No. 833,825, filed June 16, 1969, now abandoned.

BACKGROUND OF THE INVENTION

This invention relates generally to signal receiving systems and more particularly to a method and apparatus to provide angular information utilizing two antennas at fixed positions to receive frequency swept pulses or two antennas whose relative position is changed linearly with time while receiving fixed frequency pulses.

It has long been known that bats employ ultrasonic echo-location for their orientation in space. Among various techniques used in bat-sonars, one type has been found that emits constant frequency pulses which are received with ears in rapid relative motion. Conversely, another type emits linearly swept signals which are received with stationary ears.

It is assumed that these techniques provide bats primarily with angular information as opposed to distance information that is generally obtained by pulsing and frequency sweeping in manmade radars.

The advantage of a two-antenna swept frequency reception scheme is an angular resolution capability proportional and unambiguous with respect to antenna spacing. This permits the installation of small but wide-spaced antennas on aircraft.

In the constant frequency configuration using position-modulated antennas, unambiguous angular resolution is possible proportional to the frequency as well as to the position sweep width. Frequently it is necessary and desirable to utilize aircraft for mapping and in ground search operations. Such applications are generally limited by ground clutter. In order to take advantage of resonant features for the enhancement of desired targets one can be forced to use low frequency radio signals which in turn require large antennas for sufficient angular resolution. Such antennas are impractical if not impossible to be utilized in currently known aircraft.

Further, this system can find application as a navigational aid for aircraft, functioning in the very same way as it is assumed from bats. An array of two frequency sweep or position sweep systems yields complete and simultaneous angular information about multiple targets in space. If, for example, a series of transmitters in a passive ground approach system were located as markers at spaced intervals along a runway, the nagivation system is capable of telling a pilot by means of a two-dimensional perspective display his orientation with respect to the runway, similar to the human eye.

Additionally, an active system utilizing the same concept is possible where signals are transmitted from the aircraft and highly reflective members are located along the runway.

SUMMARY OF THE INVENTION

A two-antenna reception system with fixed antenna positions to receive linearly frequency-modulated signals or with linearly positioned-modulated antennas to receive fixed frequency signals can be used to determine the angle of arrival of the signals in a plane containing the two antennas and the signal source. This angular information is unambiguous within a range of 90°, independent of the antenna separation or relative antenna motion in terms of the wavelengths employed The angular resolution of such systems is proportional to the frequency sweep width and the antenna separation in one case and proportional to the relative antenna motion and the frequency in the other case.

Two orthogonally oriented systems will provide elevation and azimuth information.

In general, complete angular information in space is obtained from any two systems whose axes are not oriented in parallel. The angular position of the signal source with respect to the system baseline affects the time delay or the Doppler shift of the antenna signals in the fixed position or the linear position-modulation configuration, respectively.

The signal source represents an active transmitter as well as a passive source (reflector). Since the resolution capabilities of two-antenna systems depend on the antenna spacing or relative antenna motion width rather than on antenna size, they offer a solution when large-size antennas cannot be tolerated in particular applications. If simultaneous processing of signals arriving from different directions is provided by means of processing a spectrum of discrete difference frequencies, these schemes are capable of simultaneous acquisition of perspective information from spatially distributed signal sources. This is in contrast to any kind of electrical or mechanical beam-scanning procedure.

It is therefore an object of this invention to provide a new and improved means for finding angular information.

It is another object of the invention to provide a new and improved system to derive unambiguous directional information from a two-antenna system independent of antenna spacing or variation of this antenna spacing with time.

It is a further object of the invention to provide a new and improved system which achieves resolution through two wide-spaced or variably spaced antennas rather than large size antennas.

It is still another object of the invention to provide perspective information similar to the human eye, using an array of the two-antenna systems.

It is still a further object of this invention to provide means of simultaneous acquisition of angular information from multiple targets as opposed to sequential acquisition by mechanical or electrical beam swinging.

It is another object of the invention to provide a multiple antenna receiving system which is economical to produce and which utilizes conventional currently available components that lend themselves to standard mass production manufacturing techniques.

These and other advantages, features and objects of the invention will become more apparent from the following description taken in connection with the illustrative embodiments in the accompanying drawings, wherein:

DESCRIPTION OF THE DRAWINGS

FIG. 3 is a block diagram of the two-antenna signal processing system of the invention; and FIG. 4 is a block diagram of the double two-antenna signal processing system of the invention reduced to a three-antenna configuration.

DESCRIPTION OF THE PREFERRED EMBODIMENTS

Figure 1:
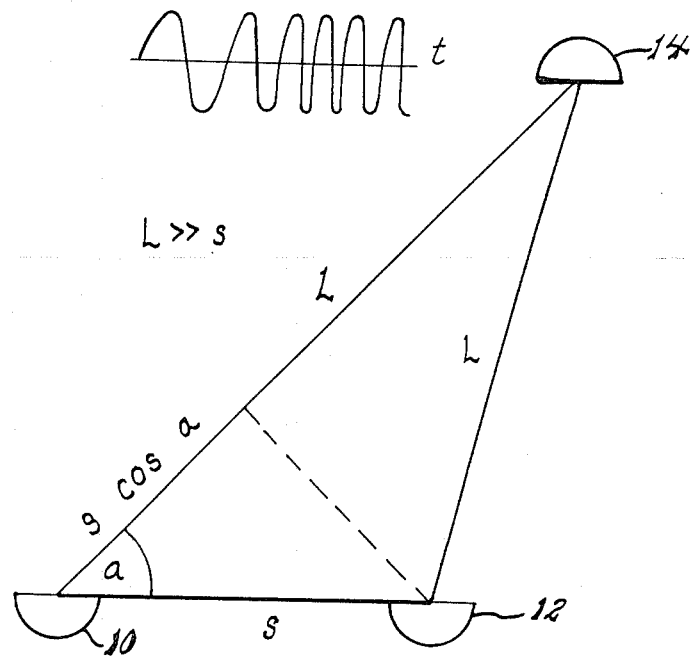
FIG. 1 is a transmitter-receiver geometry for the frequency-modulation system.
Figure 2:
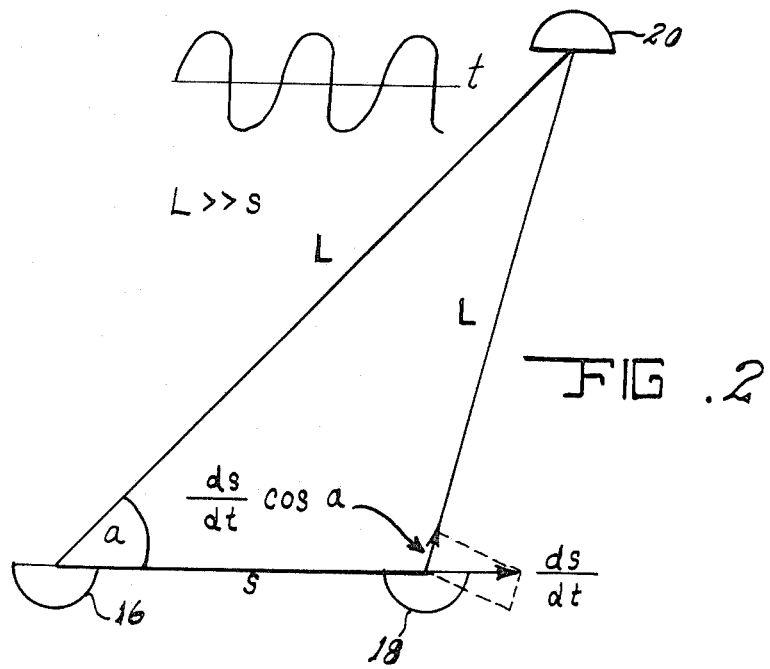
FIG. 2 is a transmitter-receiver geometry for the position-modulation system.

Referring now to FIGS. 1 and 2, two antennas 10 and 12 receive a linearly frequency-modulated signal ($df/dt$ = constant) from a source 14. By mixing the two antenna signals, a difference frequency $\Delta f$ can be generated which is a function of the angle of arrival $\alpha$, $\Delta f = (s \cdot \cos \alpha/c) \cdot (df/dt)$, where $c$ is the velocity of light. For a constant frequency signal $f$ transmitted from source 20 and a linear motion of antenna 18 as in FIG. 2 (antenna 16 fixed) the difference frequency $\Delta f$ is $\Delta f = (f \cos \alpha/c) \cdot (ds/dt)$. Here $ds/dt$ = constant is the velocity of antenna 18. When antenna 16 simultaneously moves with the same velocity in the opposite direction, $\Delta f$ doubles. A frequency sweep width df leads to a system beam width proportional to $(\lambda/s) \cdot (f/df)$ and a relative antenna motion ds to a beam width proportional to $\lambda/ds$. Here $\lambda$ is equal to $c/f$.

In FIG. 3 either of the two-antenna systems of FIGS. 1 and 2 are represented by antennas 22 and 24 which feed the received signals into the mixer 26. A difference frequency signal $\Delta f$ as a function of the angle of arrival $\alpha$ is generated in mixer 26 by heterodyning the two antenna signals according to the equations for $\Delta f$ given above. A multitude of difference frequencies $\Delta f$ are generated from a corresponding multitude of target signals, if each target signal arrives at a different angle $\alpha$. The difference frequencies $\Delta f$ are then detected in the frequency analyzer 28. This frequency analyzer may be of a simultaneous or sequential processing type, that is, a multitude of frequency selective filters covering the expected range of difference frequencies or a frequency-tunable single filter covering the same range may be employed to detect the difference frequencies. Detected signals are routed through the frequency/direction converter 30 which converts the frequencies into DC voltages proportional to the angle of arrival. The conversion process thus eliminates the non-linear relationship between $\alpha$ and $\Delta f$. Having converted the angles of arrival into proportional DC signals, these are displayed in the one-dimensional display unit 32. The term one-dimensional refers to the fact that a signal arriving from space is characterized only by its angle of arrival $\alpha$ in a single plane established by the target position and antennas 22 and 24. Unit 32 can be a CRT whose horizontal axis is scanned in synchronism with the tuning position at the frequency variable filter or while the filter bank is sequentially interrogated. If a signal appears at a particular frequency, its angular direction is displayed on the vertical axis by a corresponding height of the vertical deflection. The vertical axis can be linearly calibrated in degrees or radians.

Similarly, FIG. 4 depicts the block diagram of a set of two such systems explained in FIG. 3 which provide complete information on the spatial angular position of a target while measuring angles of arrival $\alpha_1$ and $\alpha_2$ in two different but intersecting planes. Instead of establishing these intersecting planes by the target position, common to both planes, and two appropriate pairs of antenna positions 22 and 24 of FIG. 3, one antenna 36 can be used jointly as indicated in FIG. 4. The two intersecting planes in which the angles of arrival are measured are now defined by the target position and the position of antennas 34 and 36 respectively by the target position and the position of antennas 36 and 38.

The signal processing in mixers 40 and 42 is analogous to that in mixer 26, likewise frequency analyzers 44 and 46 correspond to frequency analyzer 28. DC voltages proportional to the angles of arrival in the specified planes are derived in the frequency/direction converters 48 and 50 as outlined for unit 30. DC voltages corresponding to $\alpha_1$ and $\alpha_2$ are then displayed in a two-dimensional display unit 52 which in its simplest form consists of two units 32, but may be truly two-dimensional in that a pair $\alpha_1$ and $\alpha_2$ derived from an individual target represents the horizontal and vertical coordinates of a point on the CRT. The term two-dimensional refers to the fact that a signal arriving from space is characterized by two angles measured in non-parallel planes which uniquely define the spatial direction of the target.

Obviously, many modifications and variations of the present invention are possible in the light of the above teachings. It is therefore to be understood that within the scope of the appended claims, the invention may be practiced otherwise than as specifically described.

I claim:

1. A multiple antenna direction finding system comprising: a first and second antenna moving with a known velocity relative to each other for receiving fixed frequency signals from a target; a signal mixing means connected to each antenna for obtaining a difference frequency signal from the output of the first and second antenna; frequency analyzing means for identifying a particular frequency from a spectrum of possible frequencies at the mixer output; means to convert the identified frequency information into angular information; and a calibrated means for displaying one-dimensional directional information operatively connected to the converter means.

* * * * *